US009551882B2

(12) United States Patent
Read et al.

(10) Patent No.: US 9,551,882 B2
(45) Date of Patent: Jan. 24, 2017

(54) HEADWEAR WITH TREATMENT PADS

(71) Applicants: Alison Read, Beverly Hills, CA (US); David Schneider, Beverly Hills, CA (US)

(72) Inventors: Alison Read, Beverly Hills, CA (US); David Schneider, Beverly Hills, CA (US)

(73) Assignee: Alison Read, Los Angeles, CA (US)

( * ) Notice: Subject to any disclaimer, the term of this patent is extended or adjusted under 35 U.S.C. 154(b) by 7 days.

(21) Appl. No.: 14/670,304

(22) Filed: Mar. 26, 2015

(65) Prior Publication Data
US 2016/0282634 A1    Sep. 29, 2016

(51) Int. Cl.
G02C 1/00      (2006.01)
A61F 9/00      (2006.01)
G02C 5/00      (2006.01)
G02C 11/00     (2006.01)
G02C 7/10      (2006.01)

(52) U.S. Cl.
CPC .............. G02C 5/001 (2013.01); G02C 7/104 (2013.01); G02C 11/00 (2013.01)

(58) Field of Classification Search
CPC .......... G02C 5/001; G02C 7/104; G02C 11/00
USPC ........................................................... 351/83
See application file for complete search history.

(56) References Cited

U.S. PATENT DOCUMENTS 7,231,922 B2   6/2007  Davison
8,226,228 B2   7/2012  Shantha
2005/0229281 A1*  10/2005  Glasser .................... A61F 9/04
                                                          2/15
2008/0183118 A1*  7/2008   Weinberg ................ A61F 7/02
                                                          602/41
2010/0228689 A1*  9/2010   Hall ....................... A61F 9/025
                                                          705/500
2013/0253451 A1   9/2013   Kim
(Continued)

FOREIGN PATENT DOCUMENTS

CN    200963233    10/2007
CN    203397041    1/2014
(Continued)

OTHER PUBLICATIONS

The Dry Eye Shop, 2013 Catalog.
(Continued)

Primary Examiner — Bumsuk Won
Assistant Examiner — Grant Gagnon
(74) Attorney, Agent, or Firm — Ladas & Parry, LLP

(57) ABSTRACT

A head treatment device comprises a frame mountable on the head of a user, wherein the frame has at least one treatment area that will generally not obstruct the vision of the user when wearing the frame. The frame defines a vision area around at least one eye of the user when the user is wearing the device such that the user can see through the vision area. The device further comprises a treatment mechanism attachable to the treatment area of the frame, wherein the treatment mechanism extends between the face of the user of the device and the frame. A mounting device is associated with the treatment mechanism to connect the treatment mechanism to the treatment area of the frame, wherein the head treatment device is used to treat the head of the user through association of the head of the user with the treatment mechanism.

19 Claims, 18 Drawing Sheets

(56) References Cited

U.S. PATENT DOCUMENTS

2014/0025144 A1   1/2014   Ragan

FOREIGN PATENT DOCUMENTS

| GB | 2 418 496 B | 3/2006 |
|---|---|---|
| JP | 10033583 A | 2/1998 |
| JP | 3151465 U | 6/2009 |
| KR | 10-1463888 B1 | 11/2014 |

OTHER PUBLICATIONS

Eye-ssential Mask by THERAPEARL, (Mar. 10, 2015), <http://www.therapearl.com/products/eye-mask/>, Retrieved from *Internet Archive*. <https://web.archive.org/web/20150305024610/http://www.therapearl.com/>.

Bruder, Ophthalmic Products, (Mar. 10, 2015), <http://www.bruder.com/eye/products>. Retrieved from *Internet Archive*. <https://web.archive.org/web/20150310053510/http://www.bruder.com/ey>.

Bruder, Microwave Activated Moist Heat Compress, (Mar. 10, 2015), <http://www.bruder.com/eye/products>. Link at Bruder, Ophthalmic Products, (Mar. 10, 2015), <http://www.bruder.com/eye/products>. Retrieved from *Internet Archive*. <https://web.archive.org/web/20150310053510/http://www.bruder.com/ey>.

PCT International Search Report and Written Opinion from PCT/US2016/023849 dated Jul. 25, 2016.

* cited by examiner

HEADWEAR WITH TREATMENT PADS

BACKGROUND

Ice and cooling therapies have become a standard medical treatment of post-operative care, traumatic wounds, sports injuries and other injuries to the body. The benefits of cooling therapy include decreased blood loss, bruising, swelling, pain sensation and an increase in the rate of recovery. Alternatively, there are instances when heat therapy is desired.

The eye area is subject to swelling and "puffiness" through genetic predisposition, the aging process, sleep deprivation, poor eating habits, smoke, allergies, and late nights. Cosmetic eyelid surgery is the third most popular elective cosmetic procedure in the United States of America. Consistent with other injuries and post-surgery procedures, physicians recommend immediate post-operative cooling to the affected areas. Furthermore, in everyday living to soothe the eye area and head area, individuals may wish to apply heat, cold or therapeutic mixtures around the eye areas or to their faces and heads.

Cool pad therapy can be beneficial in providing comfort to the eye, temple, and sinus areas related to headaches, allergy symptoms, eye strain, fatigue, edema, swelling, hangover discomfort, hot or cold climate relief, and after aesthetic treatments including Botox, fillers, massage, surgery, and lasers. Heat pad and pads with natural and prepared mixtures can also be beneficial.

SUMMARY

The following embodiments and aspects thereof are described and illustrated in conjunction with systems, tools and methods that are meant to be exemplary and illustrative, and not limiting in scope.

Generally, headwear or eyewear is described which can be used in conjunction with modular devices that may be used to treat, cool or heat the area around a user's eyes. The headwear or eyewear may include a frame through which the user may see when the headwear or eyewear is worn, the frame comprising one or more mounting areas on which one or more treatment devices may be selectively and removably installed such that the treatment devices abut or are near the skin surrounding at least one of the user's eye, temple, sinus or face under normal usage. Alternatively, the frame may be receptive to mounting devices attached thereto for holding one or more treatment devices against the face. As yet another embodiment there is taught separately available treatment devices, separately available mounting devices for holding the treatment devices, and again the combination of a headwear upon which the treatment device or devices may be mounted by means of connecting or mounting devices and means. In summary, at least one embodiment involves the concept of headwear with treatment devices modularly connected thereto, the headwear not blocking the line of sight.

DETAILED DESCRIPTION

Figure 1A:
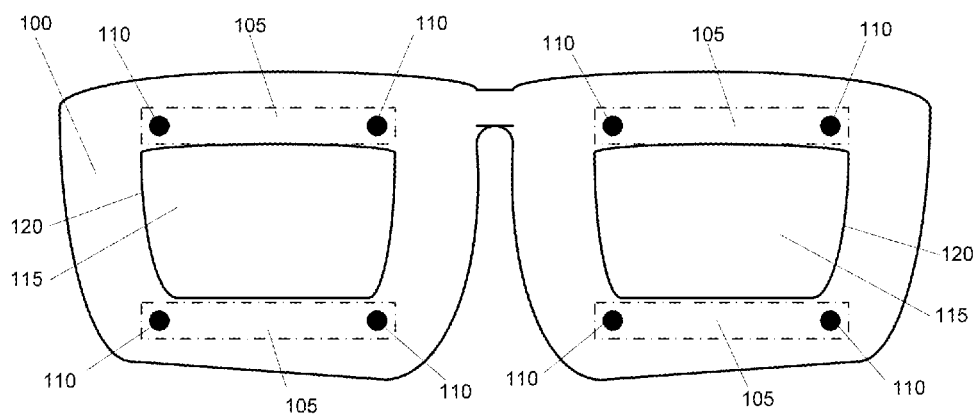
FIGS. 1A, 1B, 1C, 1D, 1E and 1F are rear views of various embodiments of an eyewear frame.
Figure 1B:
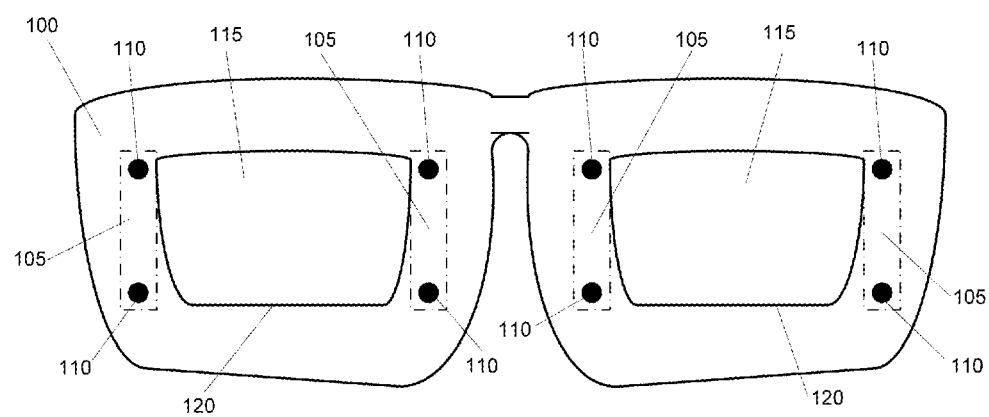
Figure 1C:
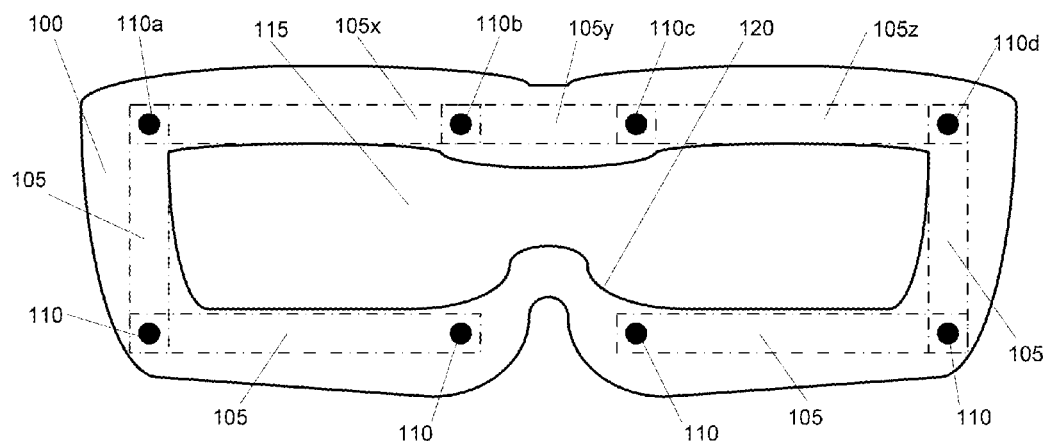

In FIG. 1A, an embodiment of headwear or eyewear is shown with eyewear Frame 100 seen from the rear view, the rear view being the side facing the wearer of Frame 100. Frame 100 forms rims 120 to hold see-through lens or lenses 115. Also the absence of a lens or lenses 115 is contemplated but an area through which the eye may see is generally provided and would be in the area of lens 115. Frame 100 also includes mounting areas 105 shown in dashed lines on the rear side of the Frame 100 facing the wearer and cavities 110 defined within the mounting areas 105. Mounting areas 105 designate areas on Frame 100 to which treatment devices 200 as seen in FIGS. 2A, 2B, 2F, 2G, and 2H, may be attached. As shown in FIG. 1A, mounting areas 105 may be formed above and below lens 115. In another embodiment, shown in FIG. 1B, mounting areas 105 may be formed to the right and left sides of lens 115.

Example materials that may be used for Frame 100 include but are not limited to plastics and metals. In one embodiment, Frame 100 may comprise a single rigid piece. However, in an alternate embodiment, Frame 100 may be flexible. In yet a further embodiment, Frame 100 may comprise multiple pieces that can be disassembled and then reassembled. In yet a further embodiment, Frame 100 may be collapsible. Frame 100 may also be made of a same material as lens 115. Frame 100 may take on various shapes.

Lens 115, if included, may be composed of a material allowing for visual ability, such as glass or plastic. Lens 115 may be optically clear or darkened to prevent ambient light from damaging or discomforting the wearer's eyes. Lens 115 may further be configured to block ultraviolet radiation, or further yet configured to be polarized to reduce glare from reflected surfaces. In yet another configuration, lens 115 may comprise material suitable for protecting the user's eyes from flying debris or caustic chemicals.

In preferred embodiments, as shown in FIGS. 1A, 1B, 1D, 1E and 1F, Frame 100 forms two rims 120 to each hold a lens, if desired. In an alternate embodiment, shown in FIG. 1C, Frame 100 may form a single rim 120 to hold a single lens 115, if desired. In this embodiment, mounting area 105$x$ is shown to overlap with mounting area 105$y$, and mounting area 105$y$ is shown to also overlap with mounting area 105$z$. Cavities 110 may be shared with multiple mounting areas 105 as seen in FIGS. 1C, 1D, 1E, and 1F. For instance, referring still to FIG. 1C, cavity 110$b$ may be a part of both mounting areas 105$x$ and 105$y$, and cavity 110$c$ may be a part of both mounting areas 105$y$ and 105$z$.

In a preferred embodiment, cavity 110, 110$a$, 110$b$, 110$c$ may form a recess on the rear of Frame 100, which as earlier noted is the side facing the user. In an alternate embodiment, cavity 110, 110$a$, 110$b$, 110$c$ may form a hole through the Frame 100 from the rear side of the frame to the front side of the frame.

Figure 1D:
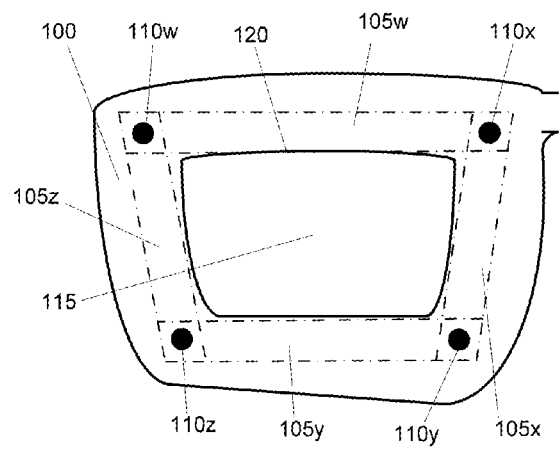

In one embodiment, as shown in FIG. 1D, four cavities 110$w$, 110$x$, 110$y$ and 110$z$ may be defined on Frame 100 surrounding lens 115 such that each cavity would form a corner of a quadrilateral. As configured, four mounting areas 105$w$, 105$x$, 105$y$ and 105$z$ may be formed such that each cavity may be part of two adjacent and overlapping mounting areas. For instance, a first cavity 110$w$ may form a first mounting area 105$w$ with a second cavity 110$x$, and first cavity 110$w$ may form a second mounting area 105$z$ with a third cavity 110$z$. It is preferable that mounting areas 105$w$, 105$x$, 105$y$, 105$z$ either partially or fully lie outside the perimeter of rim 120 and within the perimeter of Frame 100. In this configuration, treatment devices 200 of FIGS. 2A, 2B, 2F-2H may be coupled with Frame 100 on any one of the four mounting areas 105$w$, 105$x$, 105$y$ and 105$z$ surrounding the lens 115.

Figure 1E:
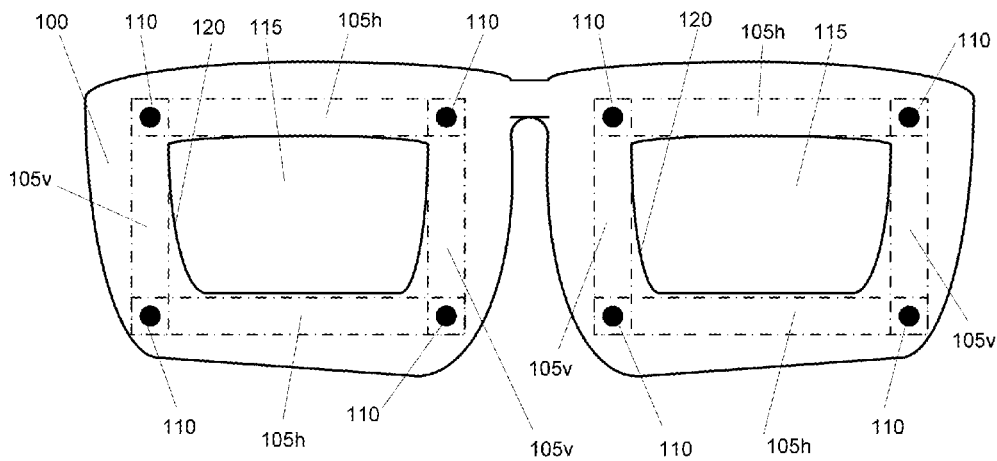

In another embodiment, as illustrated in FIG. 1E, four cavities 110 may be defined around each lens 115 of Frame 100 such that each cavity 110 is horizontally aligned with another cavity 110 and also vertically aligned with yet another cavity 110 such that each cavity would form a corner of a rectangle. As configured, each cavity 110 may be part of two overlapping mounting areas 105$h$ and 105$v$. Horizontal mounting area 105$h$ may comprise two horizontally aligned cavities 110. Vertical mounting area 105$v$ may comprise two vertically aligned cavities 110. In this configuration, treatment devices 200 of FIGS. 2A, 2B, 2F-2H may be coupled with Frame 100 either vertically or horizontally on any one of the four mounting areas 105$h$, 105$v$ surrounding the lens 115.

Although FIG. 1E illustrates that the distance between horizontally aligned cavities 110 is greater than the distance between vertically aligned cavities 110, the Frame 100 may be configured such that the distance between vertically aligned cavities 110 is greater than the distance between the horizontally aligned cavities 110. Furthermore, it is contemplated that the distance between the horizontally aligned cavities 110 may be equal to the distance between the vertically aligned cavities 110 such that each of the four cavities 110 forms a corner of a square or an equally measured arc or circle. In such an embodiment of equally sized mounting areas, a treatment device 200 of FIGS. 2A, 2B, 2F-2H configured for use with one of mounting areas, for example mounting areas 105$h$, 105$v$, may be interchangeably used with any one of the other mounting areas 105$h$, 105$v$ as well.

Figure 1F:
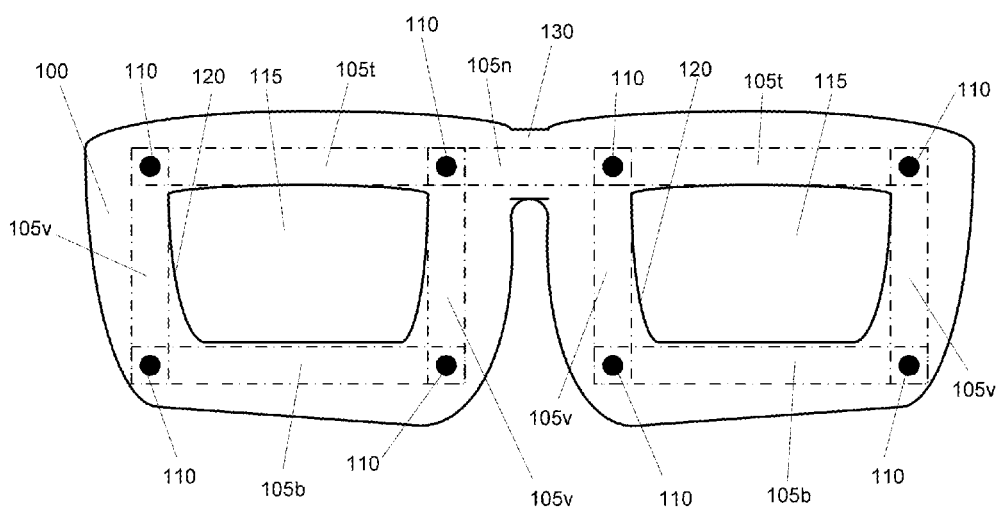

In another embodiment, as illustrated in FIG. 1F, cavities 110 may be defined around each lens 115 of Frame 100 such that cavities 110 form horizontal top mounting areas 105$t$, horizontal bottom mounting areas 105$b$, vertical mounting areas 105$v$, and a mounting area 105$n$ across the nose bridge area 130. Furthermore, it is contemplated that cavities 110 may be defined on Frame 100 such that mounting areas 105$t$ and 105$n$ may be equally sized. Thus configured, a treatment device 200 of 2A, 2B, 2F-2H, configured for use with mounting area 105$t$ may be interchangeably used with mounting area 105$n$.

Shown in FIGS. 1D, 1E, 1F are mounting areas that form a quadrilateral or rectangle on the rim of the frame around the lens. Although these figures show that the lens and rim may be in the shape of a rounded rectangle or a rounded quadrilateral, other shapes are contemplated as well. As noted earlier herein, the frame may be shaped in any way. For instance, the lens may be in the shape of an oval, circle, triangle, or hexagon. It is further contemplated that mounting areas may accordingly be shaped in any way, such as an arc, a polygon, a shape without any vertices composed of only curved and straight sides, or a combination thereof. Further, the mounting areas may simply be surfaces of the Frame 100 on which treatment devices can be attached, and in this configuration a normal pair of eyeglass frames with or without lenses, the eyeglass frames having inside surfaces that would be nearest the face when worn, could be Frame 100 to which treatment devices are attached with mounting means. Some such mounting means are described herein and others will be evident to those skilled in the art.

Figure 2A:
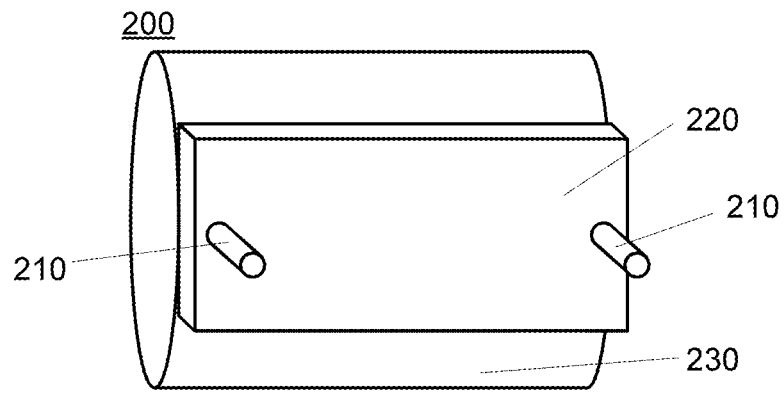
FIG. 2A is a front perspective view of an embodiment of a treatment device.
Figure 2B:
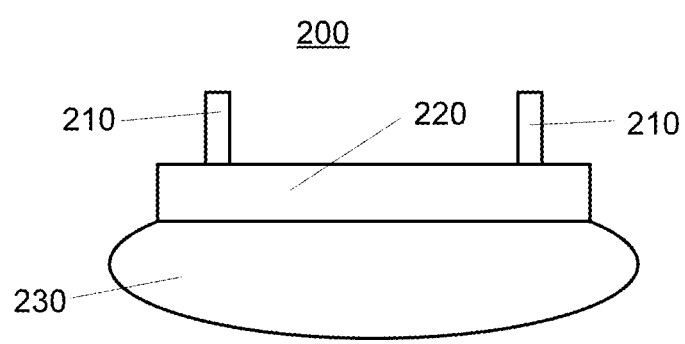
FIG. 2B is a top view of an embodiment of a treatment device.

Turning to FIGS. 2A and 2B, treatment device 200 may include mounting pins 210, mounting plate 220 from which mounting pins 210 extend, and contact pad 230 connected to, formed with or associated with mounting plate 220 opposite mounting pins 210. As illustrated in FIG. 2A, the size of contact pad 230 may be larger in planar dimension than mounting plate 220.

However, in an alternate embodiment, contact pad 230 may be smaller than or equal to the mounting plate 220 in some or all dimensions. In the shaping shown in FIG. 2A, pad 230 has a widest diameter which is greater than width of mounting plate 220 but the length of mounting plate 220 is generally equal to the length of contact pad 230. These are preferable examples but may be varied to facilitate comfortable and effective contact or nearness of contact pad 230 with the area to be treated of the user and to facilitate the connection between contact pad 230 and the headwear or eye frame on which contact pad 230 is to be mounted through a mounting means such as mounting pad 220.

Contact pad 230 may comprise solely or in addition to a compressible material, such as plastics, foam, or a plurality of materials that, when pressed against the user's eye area, will conform to the contours of the user's eye area. Contact pad 230 may comprise a material that can be cooled, heated, or absorb treatment materials, which, in use, may treat the user's eye area or face. Contact pad 230 may be further configured to hold herbal substances or ointments that, in use, may be applied to the user's eye area.

Figure 2C:
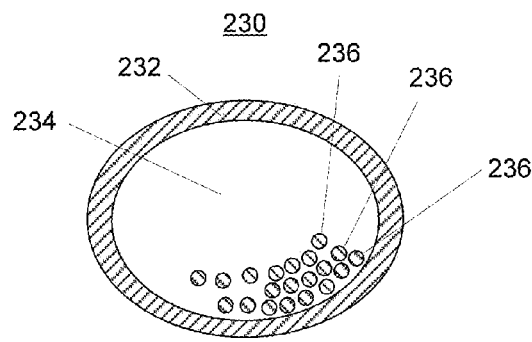
FIGS. 2C, 2D and 2E are cross-sectional views of various embodiments of a contact pad of a treatment device.

In a preferred embodiment, as shown in FIG. 2C, contact pad 230 may include an outer layer 232, an internal chamber 234, and gel beads 236 deposited within internal chamber 234. Gel beads 236 are preferably re-usable and non-toxic, and may be heated or cooled. One example of such gel beads can be found in Eye-ssential® Eye Mask by THERA-PEARL®, LLC.

In one embodiment, outer layer 232 may be composed of a flexible material such as PVC, an elastic material such as latex, or other materials that are flexible, elastic, soft, and pliable. In such an embodiment, internal chamber 234 may have a variable shape and volume. Furthermore, internal chamber 234 may be substantially filled with gel beads 236 such that when contact pad 230 is brought into contact with the user's face, the malleability of outer layer 232 allows the outer layer 232 and gel beads 236 to mold to the user's facial features.

In an alternate embodiment, internal chamber 234 may be filled with a fluid instead of gel beads 236. In such an embodiment, the fluid may be cooled or heated. Such fluids may be a refrigerant for cooling, a supersaturated solution of sodium acetate for heating, or water for both cooling and heating.

In yet another embodiment, internal chamber 234 may be filled with a combination of a fluid and gel beads 236. In such an embodiment, the fluid and gel beads 236 may together be cooled or heated.

In an alternate embodiment, outer layer 232 may be composed of woven fabric, or other porous materials. In such an embodiment, contact pad 230 may house or contain a medicated treatment, a natural treatment, an herbal treatment or ointment, so that the treatment or ointment may be applied to the areas of the user's face in contact with contact pad 230. It is conceived that internal chamber 234 may be a removable or refillable chamber such that contact pad 230 may be cleansed and may accept replaceable internal chambers 234 which can carry various substances for use in treating the eye.

Figure 2D:
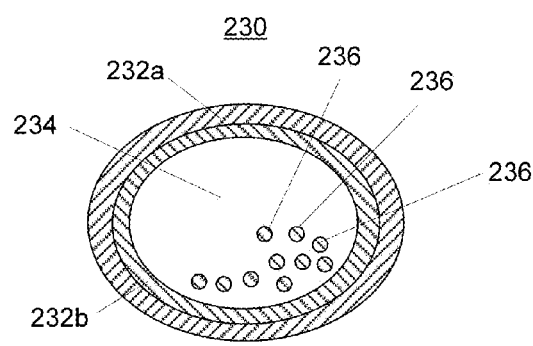

In yet a further embodiment, as illustrated in FIG. 2D, contact pad 230 may comprise multiple layers. For instance, contact pad 230 may comprise a first outer layer 232a composed of woven fabric or porous material that comes into contact with the user's face, a second inner layer 232b underneath the first outer layer 232a that is composed of a plastic or impermeable material, and an internal chamber 234 formed by the second inner layer 232b. In such an embodiment, contact pad 230 may house a medicated treatment, a natural treatment, an herbal treatment or ointment in the first outer layer 232a and contain gel beads 236 within internal chamber 234, so that contact pad 230 may simultaneously provide the user with temperature treatment and ointment or herbal application.

Figure 2E:
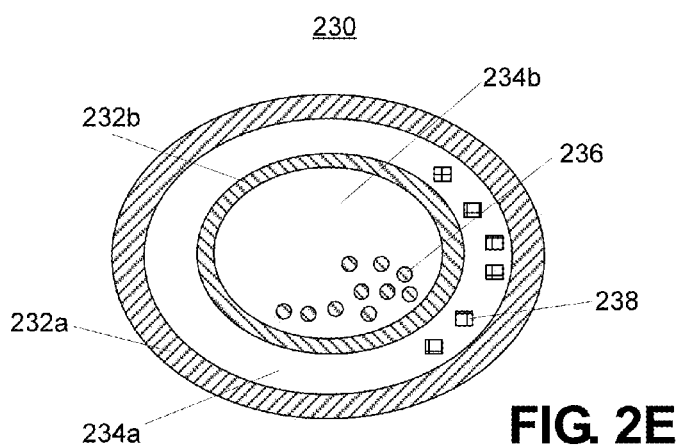
Figure 2F:
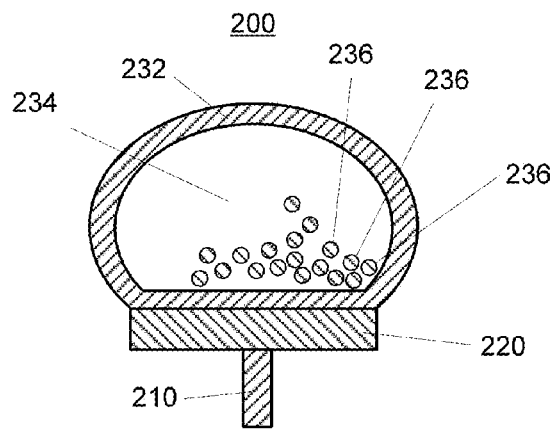
FIGS. 2F, 2G and 2H are cross-sectional views of various embodiments of a treatment device.

In yet a further embodiment, as illustrated in FIG. 2E, contact pad 230 may comprise a first cavity 234a formed between a first outer layer 232a and a second inner layer 232b, and a second cavity 234b formed within second inner layer 232b. First outer layer 232a may be a porous layer composed of, for example, woven cloth. Second inner layer 232b may be an impermeable layer composed of, for example, plastic. Herbal materials 238 may be deposited in the first cavity 234a and cooling gel beads 236 may be deposited in the second cavity 234b. As configured, contact pad 230 may simultaneously provide the user with temperature treatment and ointment or herbal application.

In yet another embodiment, contact pad 230 may comprise a material without an internal chamber 234. For instance, contact pad 230 may be a sponge, a slice of cucumber, or a conductive substance. Contact pad 230 may comprise an absorbent material that may be dipped in a treatment liquid. Contact pad 230 may be simply treated with a medicated treatment, a natural treatment, an herbal treatment or ointment, to be applied against the eye area of the user and then later discarded or cleaned for reuse.

In a preferred embodiment, mounting plate 220, which is shown in FIGS. 2F, 2G, 2I, and 3A, may be composed of a rigid or semi-rigid material, such as a plastic. Mounting plate 220 may be fixedly attached to outer layer 232 of contact pad 230 shown in these same figures. For instance, mounting plate 220 may be heat sealed or thermally bonded to outer layer 232, such as by heating the surfaces where mounting plate 220 and outer layer 232 come into contact and pressing mounting plate 220 and outer layer 232 together, thereby fusing the two surfaces. In addition, or as an alternative, to heat sealing, mounting plate 220 may be chemically sealed or chemically bonded to outer layer 232 using reactive adhesives such as epoxy, ethyl cyanoacrylate, or urethane. Non-reactive adhesives, such as polyvinyl acetate, hot melt adhesive, or rubber cement, may also be used to seal mounting plate 220 to outer layer 232.

In an alternate embodiment, mounting plate 220 may be composed of a flexible material. In a further embodiment, mounting plate 220 may be composed of a magnetic material, such as nickel, iron, cobalt or alloys thereof. In yet a further embodiment, mounting plate 220 may be composed of a magnet.

Figure 2G:
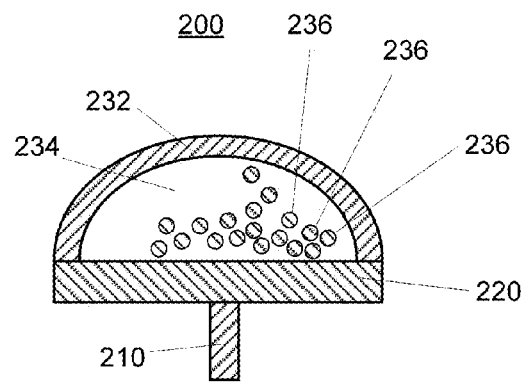

Referring to FIG. 2G, it is conceived that contact pad 230 may be manufactured such that mounting plate 220 forms a portion of contact pad 230. For example, outer layer 232 may be affixed to the edges of mounting plate 220 by means of chemical bonding, thermal bonding, or physical attachment as discussed above. In such an instance, internal chamber 234 may be formed between mounting plate 220 and outer layer 232.

Figure 2H:
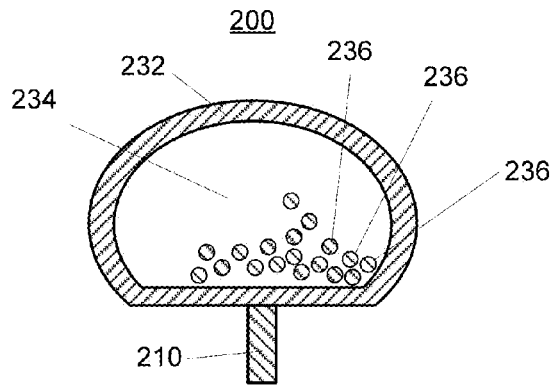

Referring to FIG. 2H, it is conceived that treatment device 200 may omit mounting plate 220 entirely. For example, mounting pins 210 may be affixed directly to outer layer 232 of contact pad 230 by means of chemical bonding, thermal bonding, or physical attachment as discussed above. Alternatively, treatment device 200 may omit mounting plate 220 and pins 210 such that it is a separate element to be used in conjunction with a mounting means to attach it to Frame 100 as is apparent through this writing.

Figure 2I:
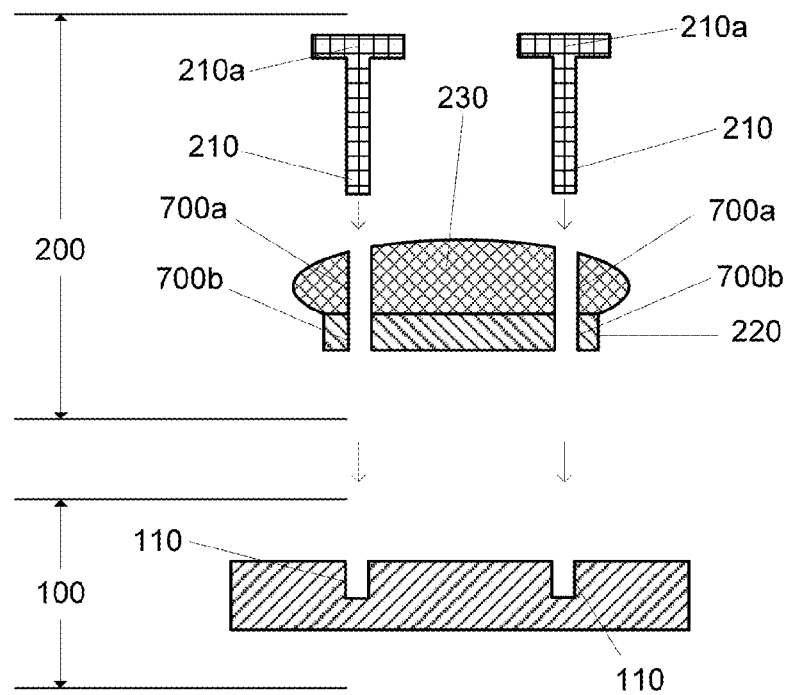
FIG. 2I is a cross-sectional view of an embodiment of a treatment device to be coupled with a portion of an eyewear frame.

In an alternate embodiment of treatment device 200, mounting plate 220 may be removably attached to outer layer 232, such as by physical means. For instance, as illustrated by FIG. 2I, mounting plate 220 may comprise holes 700b and contact pad 230 may comprise holes 700a such that holes 700a and 700b may be aligned to allow mounting pin 210 to be inserted through the holes 700a, 700b of both mounting plate 220 and contact pad 230. Mounting pin 210 may also comprise at the proximal end a plate or disc 210a with a diameter exceeding the diameter of the holes 700a, 700b of mounting plate 220 and contact pad 230, such that the distal end of mounting pin 210 may be inserted through the holes and into cavity 110 of Frame 100 so that the plate or disc 210a at the distal end of mounting pin 210 presses contact pad 230 against mounting plate 220 towards Frame 100. It is contemplated that an embodiment of treatment device 200 as illustrated in FIG. 2I may be further configured such that mounting pin 210 is fixedly attached to contact pad 230 and mounting plate 220. For example, the surface of mounting pin 210 may be affixed to the holes 700a, 700b of contact pad 230 and mounting plate 220 by means of chemical bonding, thermal bonding, or physical attachment as discussed earlier.

It is further contemplated that an embodiment of treatment device 200 as illustrated in FIG. 2I may be configured to omit the mounting plate 220 entirely so that disc 210a at the distal end of mounting pin 210 presses contact pad 230 against Frame 100.

As discussed above, mounting pin 210 may be removably attached to mounting plate 220. However, mounting pin 210 may also be fixedly attached to mounting plate 220 by means of chemical bonding, thermal bonding, or physical attachment as discussed earlier. Furthermore, mounting pin 210 and mounting plate 220 may comprise a single pin/plate 210/220 structure, formed, for example, from a single cohesive material such as a metal or a magnet.

Figure 3A:
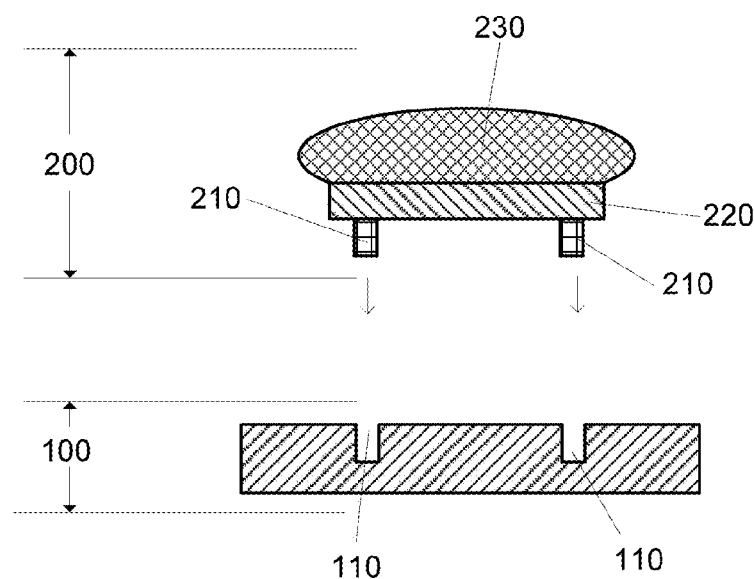
FIG. 3A is cross-sectional view of an embodiment of a treatment device to be coupled with a portion of an eyewear frame.

Referring to FIG. 3A, it is conceived that two mounting pins 210 may be attached towards opposite ends of a mounting plate 220, and positioned for insertion into cavities 110 of Frame 100.

Figure 3B:
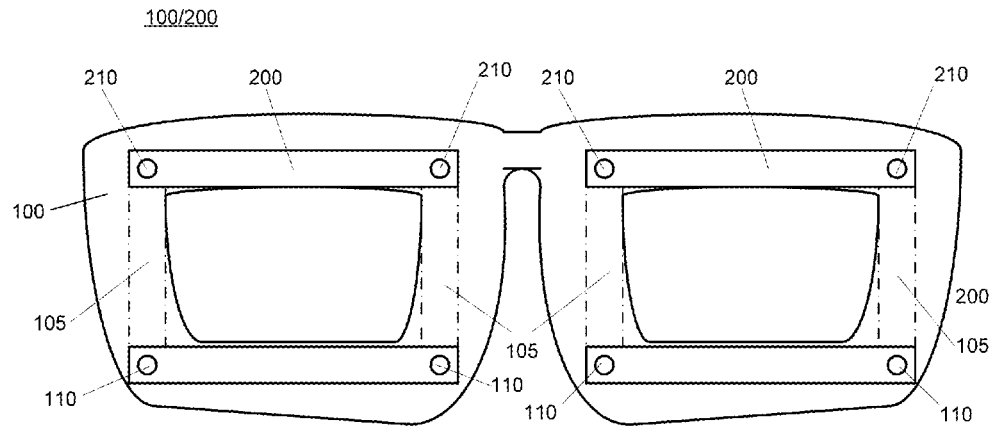
FIGS. 3B, 3C and 3D are rear views of various embodiments of an eyewear frame coupled with treatment devices.
Figure 3C:
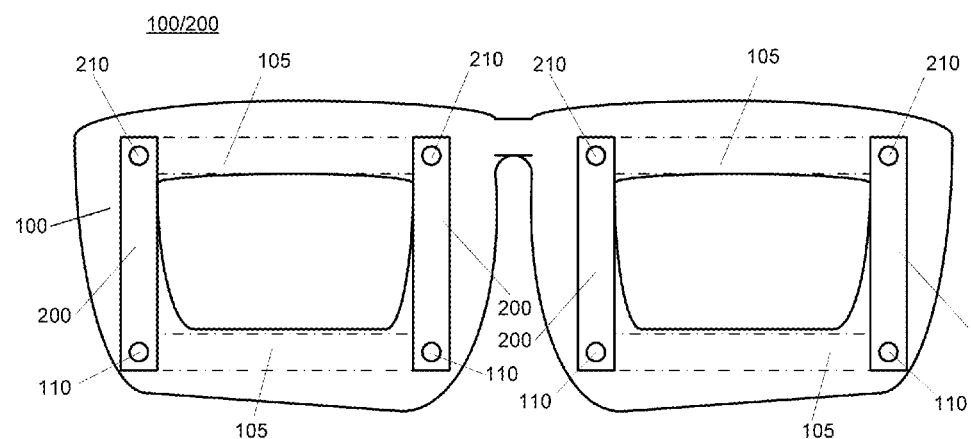

Referring to FIGS. 3B and 3C, generally, the thickness of treatment device 200 will be such that when attached to eyewear Frame 100, it will be comfortable about the face. Furthermore, treatment device 200 is preferably configured such that when treatment device 200 is mounted onto Frame 100 and the assembled frame/device 100/200 is worn by the user, treatment device 200 may be concealed from bystanders. This could, for example, be done by configuring the size and shape of treatment device 200 such that when treatment device 200 is mounted onto Frame 100, treatment device 200 fits within the perimeter of Frame 100. However, it is contemplated that treatment device 200 may be configured to extend beyond the perimeter of Frame 100.

Referring still to FIGS. 3B and 3C, mounting areas 105 may be positioned at the top, bottom and sides of each rim of Frame 100. Each mounting area 105 may include two cavities 110 positioned at opposite ends of the mounting area 105. Treatment device 200 may have two mounting pins 210 removably or fixedly attached thereto such that mounting pins 210 are positioned for insertion into the cavities 110. Thus configured, insertion of the mounting pins 210 into the cavities 110 would securely hold treatment device 200 to the Frame 100 and prevent treatment device 200 from rotating out of position.

In the configuration wherein mounting pins 210 are fixedly attached to a treatment device 200 to form a single assembly, the user may easily switch, remove, or install this single assembly onto Frame 100. Alternatively, mounting pins 210 could contain clips to clip to any pair of glasses to rest against or near the face of the user.

Figure 14:
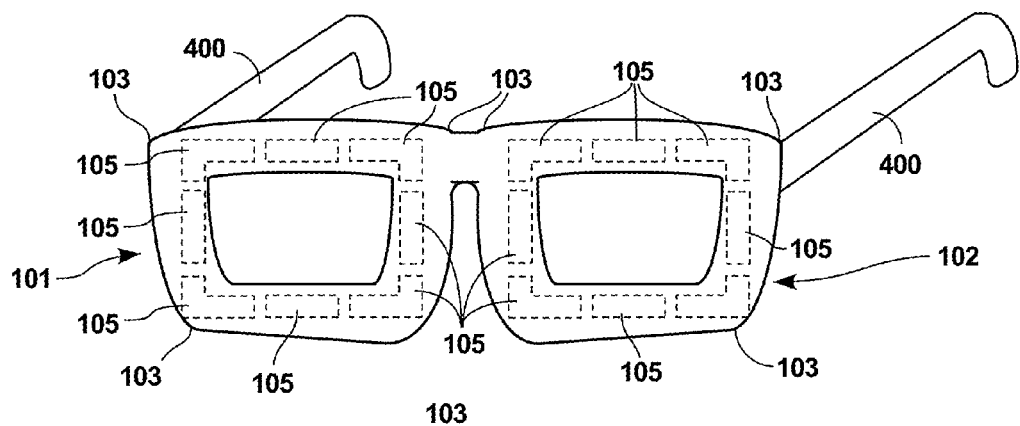
FIG. 14 is a front perspective view of an embodiment of an eyewear frame coupled with a plurality of treatment devices.

It is not necessary to affix a treatment device 200 to each and every one of the mounting areas 105. The user may selectively install treatment devices 200 on any one or any combination of the plurality of mounting areas 105. Furthermore, the user may selectively install treatment devices 200 of differing characteristics onto the plurality of mounting areas 105. For example, the user may choose to install a cold treatment device 200 onto the mounting area 105 located at the bottom of the Frame 100, and to install a hot treatment device 200 onto the mounting area 105 located at the top of the Frame 100. Additionally, there could be mounting areas 105 on the sides of the frame as shown in FIG. 14 so that the user may partially or fully surround lens 115 with treatment devices 200.

Figure 3D:
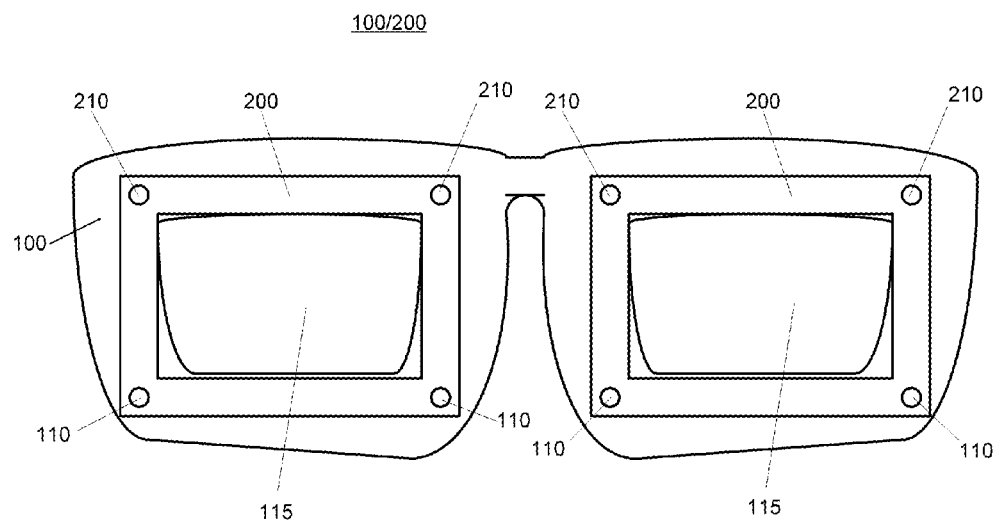

In an alternate embodiment, as illustrated by FIG. 3D, a single treatment device 200 may be configured to encircle the entire lens 115. For instance, treatment device 200 may comprise a plurality of mounting pins 210 configured to be coupled with cavities 110 of Frame 100.

Figure 4:
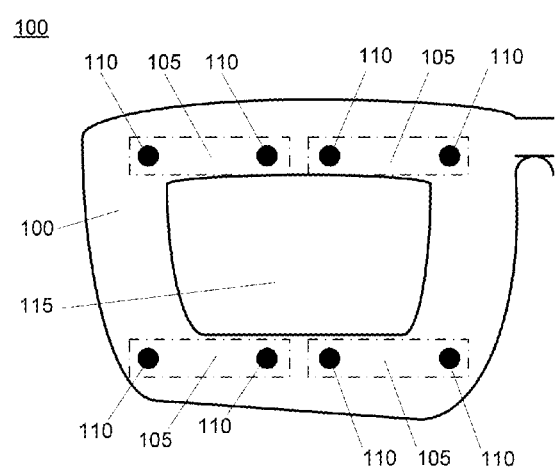
FIG. 4 is a partial rear view of an embodiment of an eyewear frame.
Figure 5:
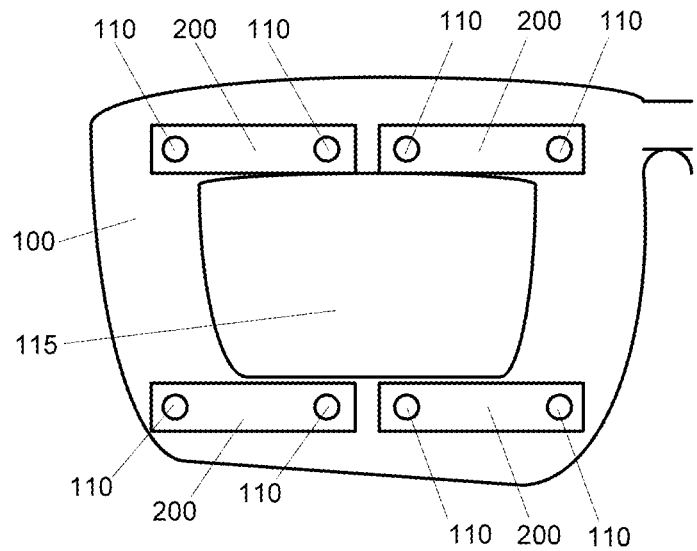
FIG. 5 is a partial rear view of an embodiment of an eyewear frame coupled with a plurality of treatment devices.

Referring to FIGS. 4 and 5, an alternate embodiment of Frame 100 may include a plurality of mounting areas 105 such that the top and bottom portions of a rim of Frame 100 may each comprise two mounting areas 105, on which any combination of treatment devices 200 may be installed.

Figure 6:
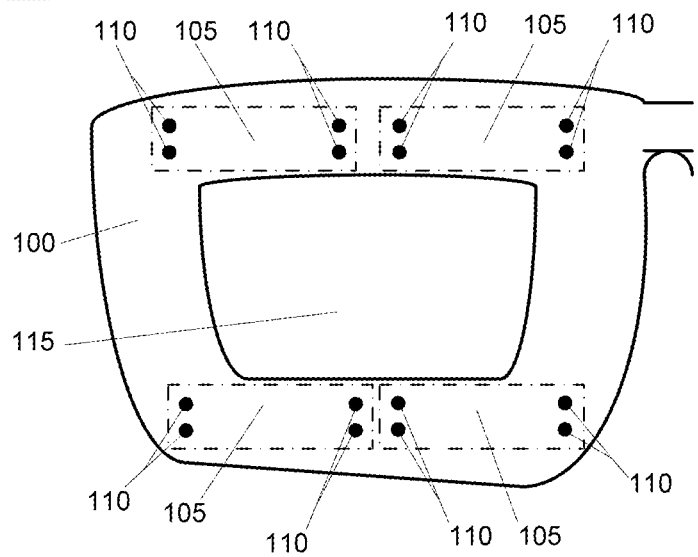
FIG. 6 is a partial rear view of an embodiment of an eyewear frame.
Figure 7:
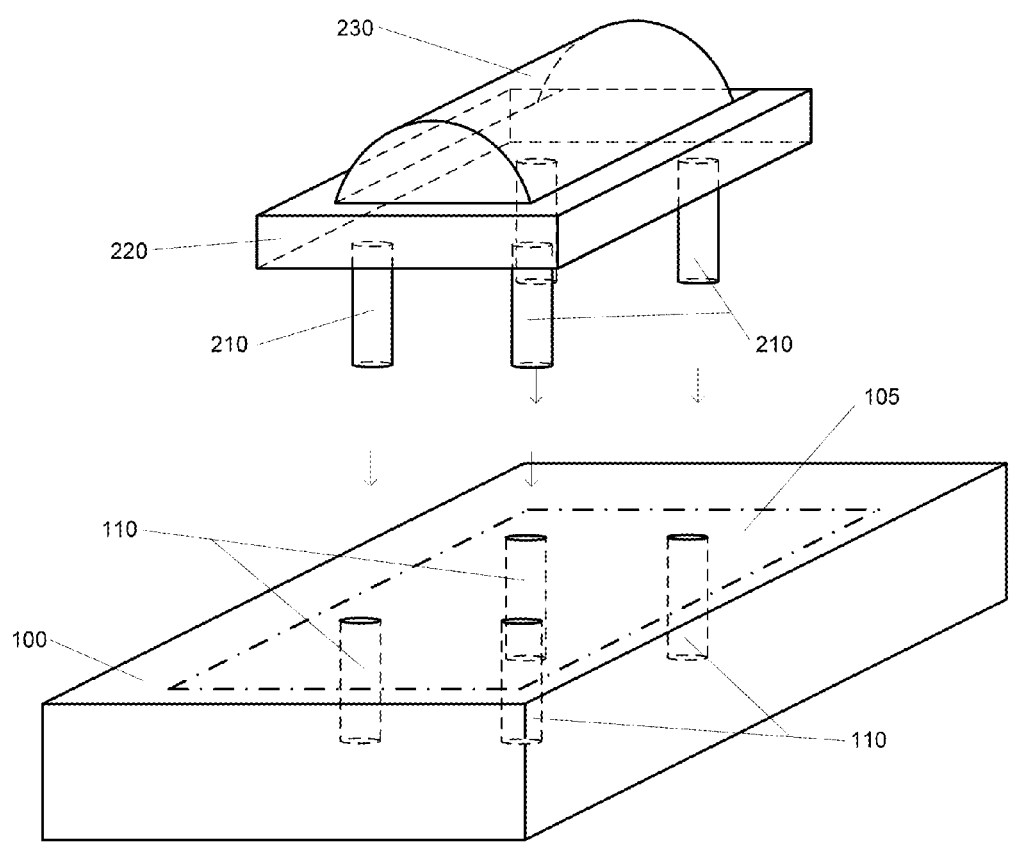
FIG. 7 is a perspective view of an embodiment of a treatment device to be coupled with an eyewear frame.

Referring to FIGS. 6 and 7, an alternate embodiment of a mounting area 105 may include any number of cavities 110 configured to couple with mounting pins 210 fixedly or removably attached to treatment device 200.

Figure 8:
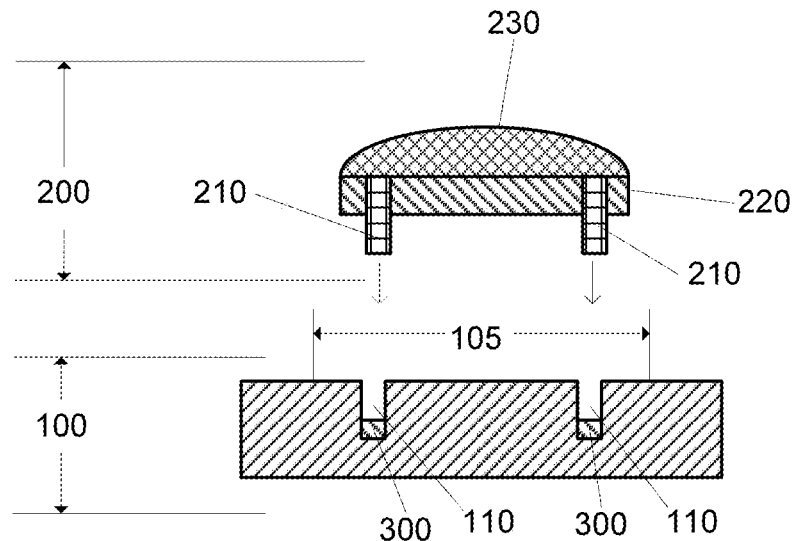
FIGS. 8 and 9 are cross-sectional views of embodiments of a treatment device to be coupled with the eyewear frame.

Referring to FIG. 8, in one embodiment the mounting areas 105 may comprise a plurality of cavities 110 into which mounting pins 210 may be inserted. A magnet 300 is fixedly disposed within each cavity 110, and the mounting pins 210 comprise magnetic material, such as nickel, iron, cobalt or alloys thereof. Inserting mounting pins 210 into cavities 110 will cause the mounting pins 210 to magnetically couple with the magnets 300 within cavities 110, thereby securely installing associated treatment device 200 onto the eyewear Frame 100.

Figure 9:
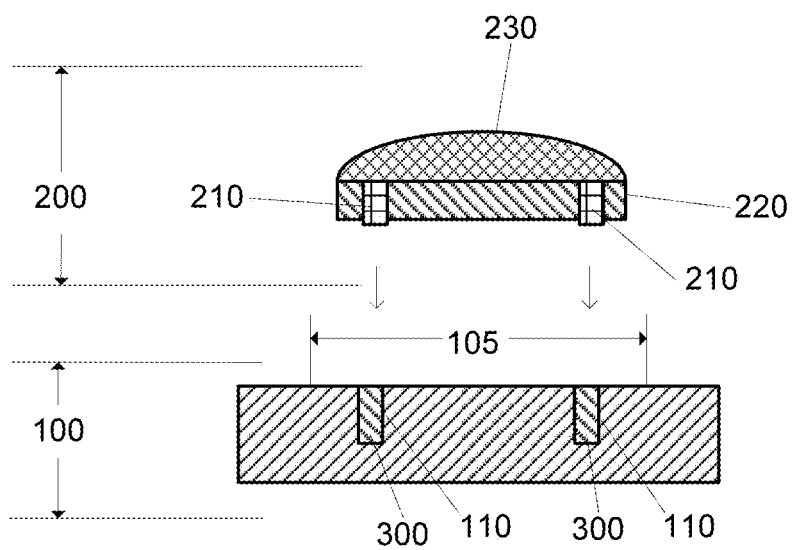

In an alternate embodiment, as illustrated in FIG. 9, the cavities 110 of a mounting area 105 may each be filled with a magnet 300 such that the magnet 300 is substantially flush with the surface of the mounting area 105, and the mounting pins 210 associated with the mounting area 105 may comprise magnetic material. In this alternate embodiment, the mounting pins 210 may be magnetically affixed to the mounting area 105. Furthermore, it is contemplated that mounting pins 210 may be configured to be substantially flush with mounting plate 220.

Figure 10:
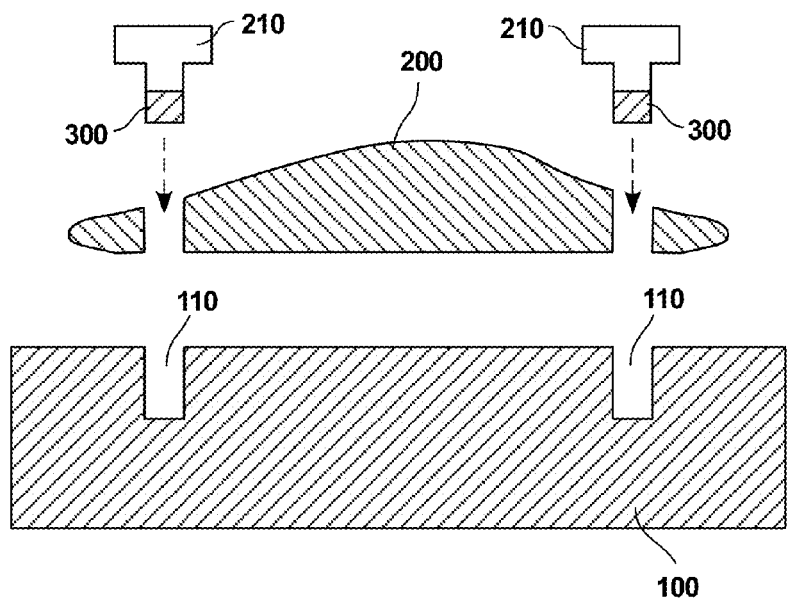
FIG. 10 is an exploded cross-sectional view of an alternate embodiment of a treatment device coupled with the mounting area of an eyewear frame.

Referring to FIG. 10, in yet another embodiment, the cavities of a mounting area 105 may comprise a magnetic material, such as nickel, iron, cobalt or alloys thereof, and the associated mounting pins 210 may comprise a magnet 300. In this embodiment, mounting pins 210 may be inserted into the cavities 110, thereby magnetically affixing the mounting pin 210 to the cavity 110.

In an alternate embodiment, magnetic material may be fixedly disposed within the cavities 110 of a mounting area 105 such that the magnetic material is substantially flush with the surface of the mounting area 105, and the mounting pins 210 may comprise a magnet 300. In this alternate embodiment, the mounting pins 210 may be magnetically affixed to the mounting area 105.

In yet a further embodiment, a first magnet may be disposed within cavity 110, and the associated mounting pin 210 may comprise a second magnet such that when the mounting pin 210 is inserted into the cavity 110, the surfaces of first and second magnets that face the other are of opposite magnetic poles. In this embodiment, the mounting pin 210 may be magnetically affixed to the first magnet disposed within the cavity 110.

In an alternate embodiment, the cavities 110 of a mounting area 105 may each comprise a first magnet such that the first magnet is substantially flush with the surface of the mounting area 105, and the mounting pins 210 may comprise a second magnet. In this alternate embodiment, mounting pin 210 is magnetically affixed to the mounting area 105.

In yet a further embodiment, cavities 110 of a mounting area 105 may each comprise a magnet, and mounting plate 220 may comprise a magnetic material, such as nickel, iron, cobalt or alloys thereof, such the magnets of cavities 110 may be magnetically affixed to mounting plate 220, thereby avoiding the use of mounting pins 210. Similarly, in another embodiment, cavities 110 of a mounting area 105 may each comprise a magnetic material and mounting plate 220 may comprise a magnet.

Although magnetic engagement between treatment device 200 and Frame 100 has been discussed, such engagement is not necessarily limited to magnetic engagement. For instance, treatment device 200 may instead be physically engaged with Frame 100, such as by clipping means, Further, the pins can be of plastic, nylon, rubber, wood bamboo and other materials and engage with Frame 100 through engagement means that would be obvious to those skilled in the art and would not be magnetic, thereby dispensing with the need for magnetic engagement. Frame 100 could have threaded openings for receipt of threaded pins used to hold treatment devices 200 in place.

Figure 11:
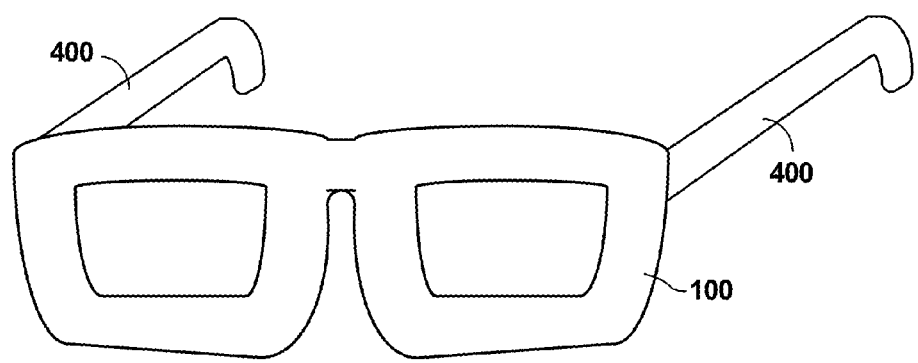
FIG. 11 is a front perspective view of an embodiment of an eyewear frame with arms attached.
Figure 12A:
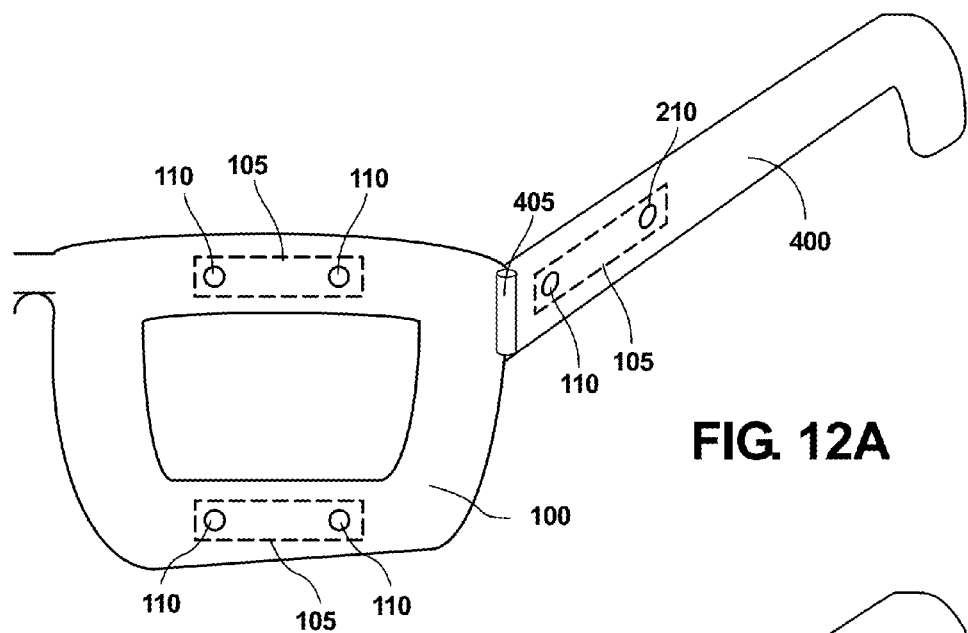
FIG. 12A is a partial rear perspective view of an embodiment of an eyewear frame with arms attached.
Figure 12B:
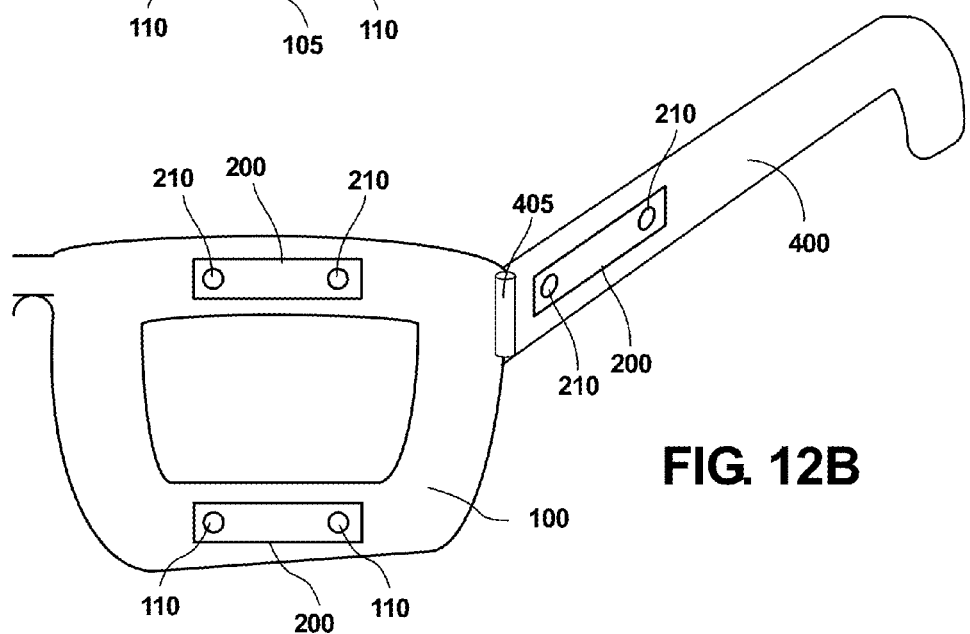
FIG. 12B is a partial rear perspective view of an embodiment of an eyewear frame with arms attached and coupled with a plurality of treatment devices.

Referring to FIGS. 11, 12A and 12B, in another embodiment, the sides of eyewear Frame 100 are attached by hinges 405 to arms 400, which include a plurality of mounting areas 105 on the Frame 100 and arms 400, on which a plurality of treatment devices 200 may be installed. In this configuration, treatment devices 200 may be installed onto the arms 400, thereby providing the user with another option of positioning of the treatment device 200. For example, the treatment device 200 mounted to the arms 400 may come into contact with not only the user's eye area, but also the side of the face such as around the temple.

Figure 13:
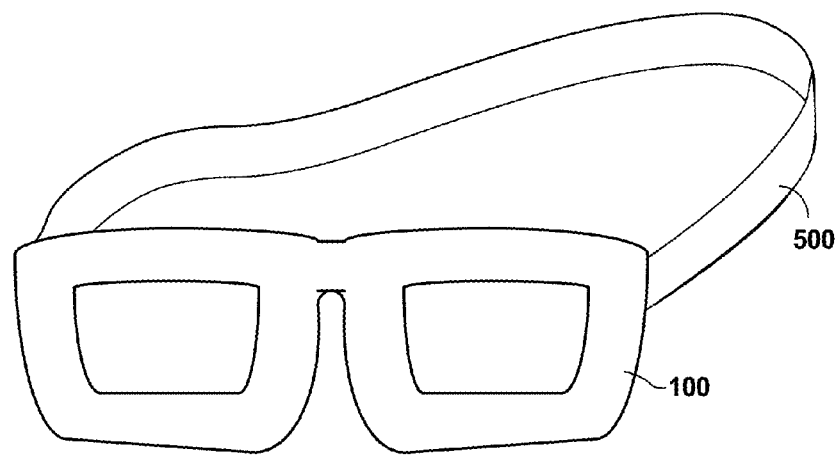
FIG. 13 is a front perspective view of an embodiment of an eyewear frame coupled with an elastic band.

Referring to FIG. 13, in yet another embodiment, the sides of eyewear Frame 100 are attached to an elastic band 500, which in use may be wrapped around the user's head.

As an alternate embodiment seen in FIG. 14, Frame 100 may be part of lens 115 as 100/115 and treatment devices 200 may be attached to Frame 100 as above discussed or as further discussed herein.

As a further embodiment seen in FIG. 14, mounting areas 105 may be on opposing sides 101 and 102 of frame lens 100/115 and in joinder areas 103 between the top and bottom of Frame 100 or frame lens 100/115.

Figure 15A:
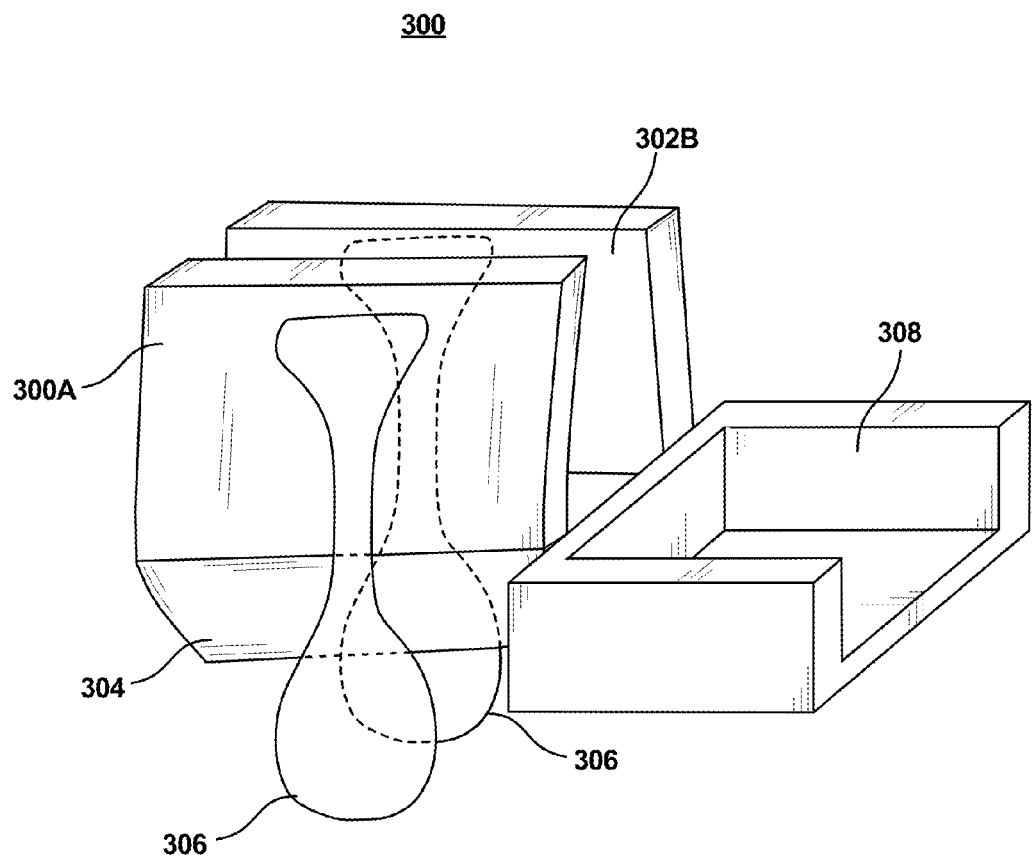
FIGS. 15A and 15B are perspective views of various embodiments of a mount clip.
Figure 15B:
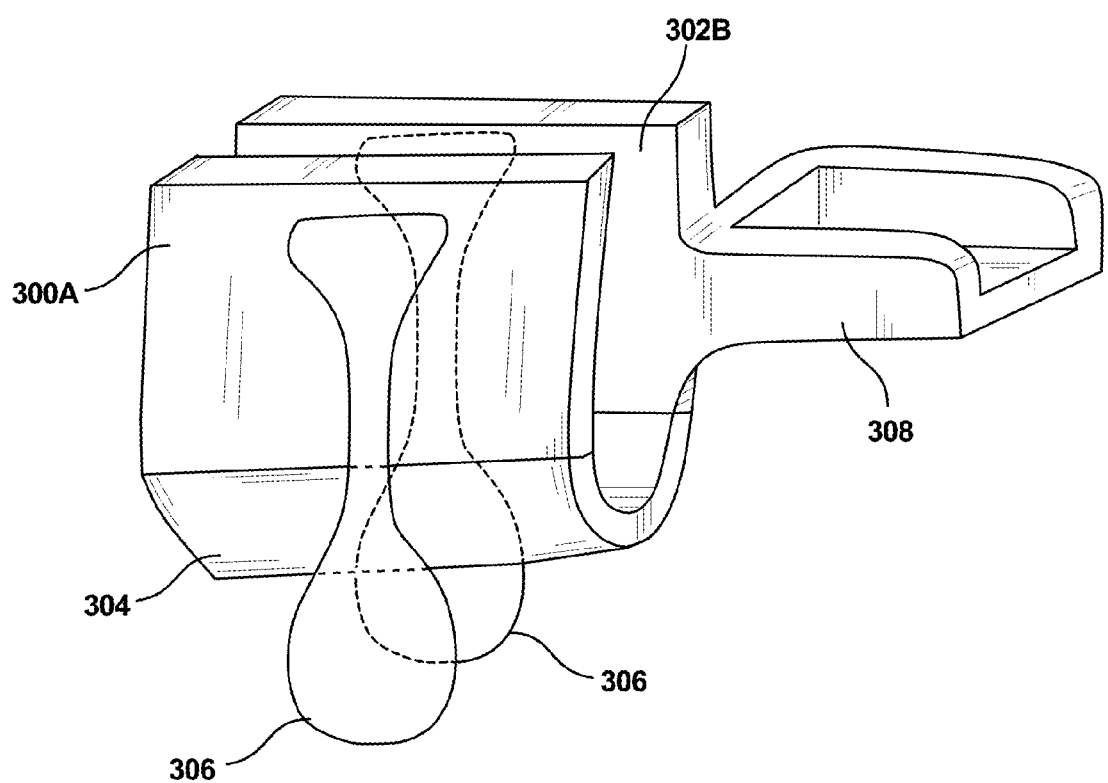
Figure 16:
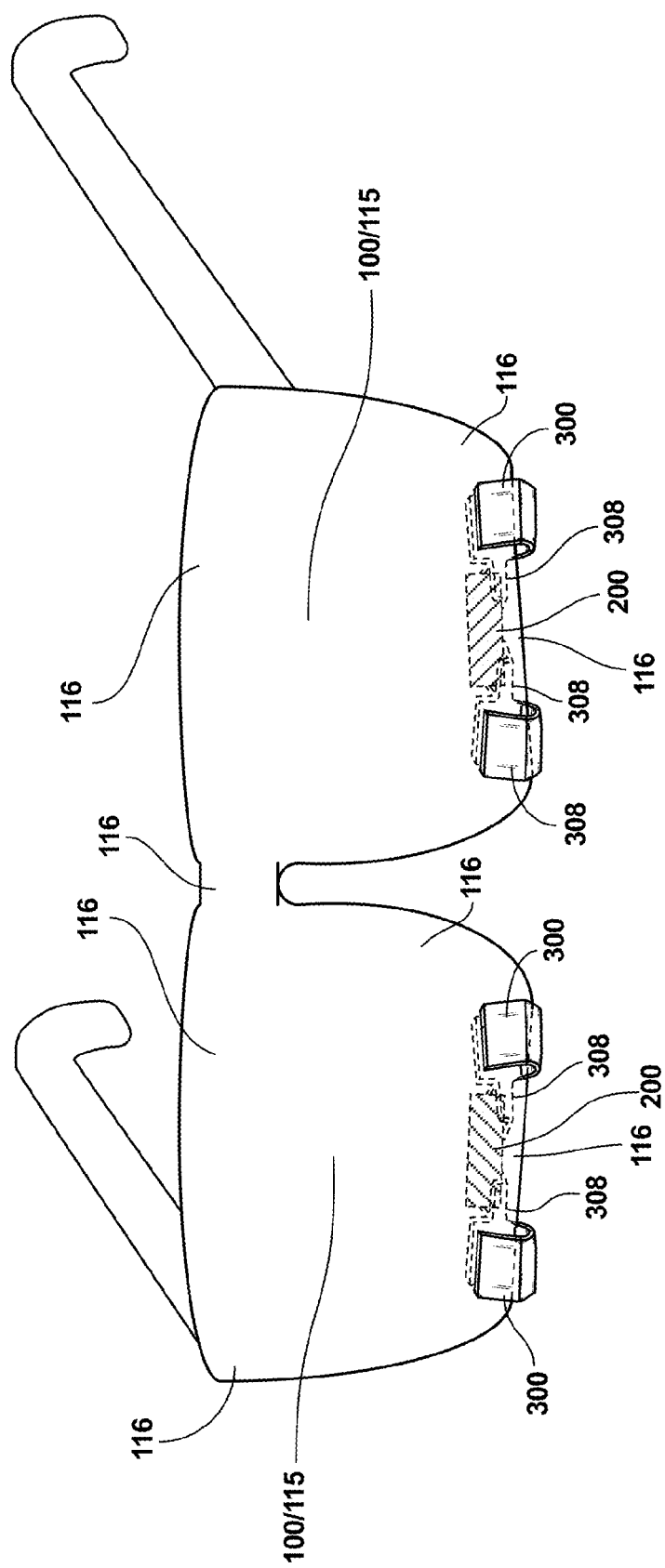
FIG. 16 is a perspective view of an embodiment of an eyewear frame coupled with mounting clips and treatment devices.

As a further embodiment, pins 210 may comprise multi-coupled clips that clip to the frame/lens 100/115 and clip to a treatment device 200. In such an instance cavities 110 may be dispensed with. Mounting devices 210, 200, 110 may be absent and instead, mount clips 300 as seen in FIGS. 15A and 15B may be used on any pair of glasses. Mounting clip 300 is comprised of a body 302 having a first side 302a and a second side 302b normally bent at base 304 to be in contact with each other. However, handles 306 extend from first and second sides 302a and 302b to bias first and second sides away from each other, allowing mount clip 300 to be placed on the edge of lens/frame 100/115 as seen in FIG. 16. Note in this instance treatment device 200 may be comprised only of contact pad 230 or of contact pad 230 attached to mounting plate 220.

FIG. 16 is also of note, as it no longer presents a lens area 115 defined separately from a Frame 100. Rather, the lens and frame are one piece 100/115 having at least a transparent area over they eye area enabling the user to see through the lens/frame 100/115 combination at least in the area of vision. Lens/frame 100/115 may be composed of a translucent material such as glass or plastic, and may further comprise an outer peripheral area 116 upon which mount clip 300 may be attached by means herein described in order to hold contact pads 230 or treatment devices 200 to treat the areas of the face that the user desires treated. Other mounting means for connecting treatment devices 200 to the outer peripheral area 116 will be apparent to those skilled in the art, including threaded pin engagement through openings formed in peripheral area 116 for such pins.

As illustrated in FIG. 16, mount clip 300 may omit handles 306 entirely, and be pushed onto the lens/frame 100/115 such that lens/frame 100/115 is wedged between first and second sides 302a and 302b. Extending from body 300 is treatment device holder 308 wherein a treatment device 200 may be placed in the holders 308 of two clips 300 to extend across the lens/frame 100/115 to abut the face for treatment. This is seen in FIG. 16 wherein the treatment devices 200 are only being used at the bottom portions of lens/frame 100/115. It is further contemplated that holders 308 may be configured to hold a contact pad 230 of treatment device 200, instead of the entire treatment device 200.

This disclosure has presented at least the following concepts.

Concept 1. An apparatus for applying treatment to a user's head and face area comprising:

an eyeglass frame forming a pair of rims surrounding each of the user's eyes, a bridge coupling the rims and extending over the nose of the wearer when the apparatus is worn by the user, and ear pieces extending from the rims to the ears of the wearer when the apparatus is worn, each rim defining an area for vision by the eyes of the wearer, the frame having a rear surface which rests closest to the user's face when the frame is worn by the user and a front surface opposite the rear surface;

at least one treatment device to be engaged with the frame, the treatment device comprising a material to treat an area of the face and head; and at least one engagement device for engaging the treatment device with the frame, wherein a plurality of treatment devices may be engaged with the frame to selectively treat specific areas of the face and head.

Concept 2. The apparatus of Concept 1, further comprising a translucent lens disposed in the area for vision.

Concept 3. The apparatus of Concept 2, wherein the translucent lens is tinted or darkened to reduce the amount of ambient light reaching the user's eye when the apparatus is worn by the user.

Concept 4. The apparatus of any one of the preceding Concepts, wherein the treatment devices may be releasably engaged with the frame to treat the face and head of the wearer.

Concept 5. The apparatus of any one of the preceding Concepts, wherein the treatment device used to treat the area of the face and head comprises a material to enable at least one of heat, cold, medications, herbs, plant substances or ointments treatment to the head and face area of the user.

Concept 6. The apparatus of any one of the preceding Concepts, wherein the treatment device further comprises a pliable pad having an elastic, impermeable outer layer and an internal chamber, the pad shaped to contact facial skin around the user's eye when the treatment device is engaged with the frame and the apparatus is worn by the user.

Concept 7. The apparatus of Concept 6, further comprising a plurality of gel beads disposed in the internal chamber, the gel beads able to be heated or cooled.

Concept 8. The apparatus of any one of the preceding Concepts, wherein the engagement device comprises a rigid plate affixed to the pad, the plate having a first end and a second end.

Concept 9. The apparatus of Concept 8, wherein a first pin is affixed to the first end of the plate and a second pin is affixed to the second end of the plate.

Concept 10. The apparatus of Concept 9, further comprising a plurality of cavities defined on the rear side of the frame on the rim surrounding the area for vision, configured to be removably coupled with the first and second pins.

Concept 11. The apparatus of Concept 10, further comprising a first magnetic material disposed in the cavities, wherein the first and second pins comprise a second magnetic material configured to be magnetically attachable to the first magnetic material disposed in the cavities.

Concept 12. The apparatus of Concept 10 or 11, wherein each rim comprises four quadrants defined by bisecting the rim vertically and horizontally, the apparatus further comprising at least one cavity defined on the rear side of the frame in each of the four quadrants of each rim.

Concept 13. The apparatus of Concept 12, wherein the first pin is configured to be coupled with a cavity of a first quadrant of the rim and wherein the second pin is configured to be either coupled with a cavity of a second quadrant horizontally adjacent to the first quadrant or with a cavity of a third quadrant vertically adjacent to the first quadrant.

Concept 14. The apparatus of Concept 12 or 13, wherein at least one cavity defined in a quadrant of a rim is aligned with another cavity defined in a quadrant of the other rim, such that a treatment device may be installed across the bridge onto these two cavities.

Concept 15. A head treatment device comprising:
a frame mountable on the head of a user, the frame having at least one treatment area, the one treatment area not being in an area that will obstruct the vision of the user when wearing the frame; the frame further defining a vision area around at least one eye of the user of the device when the user is wearing the device such that the user, when wearing the frame can see through the vision area;
a treatment mechanism, the treatment mechanism being attachable to the treatment area to extend between the face of the user of the device and the frame;
a mounting device associated with the treatment mechanism such that the mounting device connects the treatment mechanism to the treatment area of the frame, wherein the head treatment device is used to treat the head of the user through association of the head of the user with the treatment mechanism.

Concept 16. The head treatment device of Concept 15, wherein the treatment mechanism may be heated or cooled to convey a temperature differential to the head of the user when attached to the head treatment device when the wearer wears the head treatment device.

Concept 17. The head treatment device of Concept 15 or 16, wherein the treatment mechanism contains beneficial substances to be conveyed to the head of the user through contact with the head of the user when attached to the head treatment device when the wearer wears the head treatment device.

Concept 18. The head treatment device of any one of Concepts 15 through 17, wherein the treatment mechanism is removably attached to the head treatment device.

Concept 19. The head treatment device of any one of Concepts 15 through 18, wherein the head treatment device is shaped as eye glasses having an outside peripheral area and a lens area, the at least one treatment area being located in the outside peripheral area of the eye glasses, the lens area being translucent.

Concept 20. The head treatment device of Concept 19, wherein the outside peripheral areas include that area of the glasses which extends over the bridge of the nose of the wearer.

Concept 21. The head treatment device of Concept 19 or 20 wherein the outside peripheral area includes those areas of the glasses extending toward and to the ears of the wearer of the head treatment device.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for . . . " and no method or process step herein is to be construed under those provisions unless the step, or steps, are expressly recited using the phrase "comprising the step(s) of . . . ."

All elements, parts and steps described herein are preferably included. It is to be understood that any of these elements, parts and steps may be replaced by other elements, parts and steps or deleted altogether as will be obvious to those skilled in the art.

Broadly, this writing discloses at least a head treatment device comprising a frame mountable on the head of a user, wherein the frame has at least one treatment area that will generally not obstruct at least the direct vision of the user when wearing the frame. The frame defines a vision area around at least one eye of the user when the user is wearing the device such that the user can see through the vision area. The device further comprises a treatment mechanism attachable to the treatment area of the frame, wherein the treatment mechanism extends between the face of the user of the device and the frame. A mounting device is associated with the treatment mechanism to connect the treatment mechanism to the treatment area of the frame, wherein the head treatment device is used to treat the head of the user through association of the head of the user with the treatment mechanism.

What is claimed is:
1. An apparatus for applying treatment to a user's head and face area comprising:
an eyeglass frame forming a pair of rims surrounding each of the user's eyes, a bridge coupling the rims and extending over the nose of the wearer when the apparatus is worn by the user, and ear pieces extending from the rims to the ears of the wearer when the apparatus is worn, each rim defining an area for vision by the eyes of the wearer, the frame having a rear surface which rests closest to the user's face when the frame is worn by the user and a front surface opposite the rear surface and comprising a plurality of mounting areas, wherein each of the mounting areas comprises cavities;

at least one treatment device to be engaged with the frame, the at least one treatment device comprising a material configured to treat an area of the face or head; and at least one engagement device, each of the at least one engagement device configured to engage one of the at least one treatment device with the frame at one of the plurality of mounting areas, wherein each of the at least one treatment device can be separately moved to different positions on the eyeglass frame where each of the at least one treatment device engages one of the plurality of mounting areas to separately treat specific areas of the face or head.

2. The apparatus of claim 1, further comprising a transparent lens disposed in the area for vision.

3. The apparatus of claim 2, wherein the transparent lens is tinted or darkened to reduce the amount of ambient light reaching the user's eye when the apparatus is worn by the user.

4. The apparatus of claim 1, wherein the treatment devices are releasable from the frame.

5. The apparatus of claim 4, wherein the treatment device used to treat the area of the face or head comprises a material to enable at least one of heat, cold, medications, herbs, plant substances or ointments treatments to the head and face area of the user.

6. The apparatus of claim 4, wherein the treatment device further comprises a pliable pad having an elastic impermeable outer layer and an internal chamber, the pad shaped to contact facial skin around the user's eye when the treatment device is engaged with the frame and the apparatus is worn by the user.

7. The apparatus of claim 6, further comprising a plurality of gel beads disposed in the internal chamber, the gel beads configured to be heated or cooled.

8. The apparatus of claim 6, wherein the engagement device comprises a rigid plate affixed to the pad, the plate having a first end and a second end.

9. The apparatus of claim 8, wherein a first pin is affixed to the plate proximate the first end of the plate and a second pin is affixed to the plate proximate the second end of the plate.

10. The apparatus of claim 9, f wherein the cavities are defined on the rear side of the frame on the rim surrounding the area for vision, configured to be removably coupled with the first and second pins.

11. The apparatus of claim 10, further comprising a first magnetic material disposed in the cavities, wherein the first and second pins comprise a second magnetic material configured to be magnetically attachable to the first magnetic material disposed in the cavities.

12. The apparatus of claim 10, wherein each rim comprises four quadrants defined by bisecting the rim vertically and horizontally, the apparatus further comprising at least one cavity defined on the rear side of the frame in each of the four quadrants of each rim.

13. The apparatus of claim 12, wherein the first pin is configured to be coupled with a cavity of a first quadrant of the rim and wherein the second pin is configured to be either coupled with a cavity of a second quadrant horizontally adjacent to the first quadrant or with a cavity of a third quadrant vertically adjacent to the first quadrant.

14. The apparatus of claim 12, wherein at least one cavity defined in a quadrant of a rim is aligned with another cavity defined in a quadrant of the other rim, such that a treatment device can be installed across the bridge onto these two cavities.

15. A head treatment device comprising:
a treatment mechanism;
a frame mountable on the head of a user;
at least one treatment area located on the frame;
the frame further defining a vision area around at least one eye of the user of the device when the user is wearing the device such that the user, when wearing the frame with the treatment mechanism attached, the user can see through the vision area;
the treatment mechanism being attachable to the treatment area to extend between the face of the user of the device and the frame;
a mounting device associated with the treatment mechanism such that the mounting device connects the treatment mechanism to the treatment area of the frame, wherein the head treatment device treats the head of the user, not including an eye, through association of the head of the user with the treatment mechanism, wherein the treatment mechanism is configured to be heated or cooled and attached to the head treatment device and subject the head of the user to a temperature differential when the wearer wears the head treatment device.

16. The head treatment device of claim 15, wherein the treatment mechanism contains beneficial substances to be conveyed to the head of the user through contact of the treatment mechanism with the head of the user when the treatment mechanism is attached to the head treatment device and the wearer wears the head treatment device.

17. The head treatment device of claim 15, wherein the treatment mechanism is removably attached to the head treatment device.

18. The head treatment device of claim 15, wherein the head treatment device is shaped as eye glasses having an outside peripheral area and a lens area, the at least one treatment area being located in the outside peripheral area of the eye glasses, the lens area being transparent.

19. The head treatment device of claim 18, wherein the outside peripheral areas include an area of the glasses which extends over the bridge of the nose of the wearer, and areas of the glasses extending toward and to the ears of the wearer of the head treatment device.

* * * * *